United States Patent
Worthing

[15] 3,665,887
[45] May 30, 1972

[54] APPARATUS FOR FEEDING A CABLE THROUGH AN APERTURE IN A BULKHEAD SEPARATING TWO LIQUIDS AT DIFFERENT PRESSURES

[72] Inventor: Nicolas Worthing, London, England

[73] Assignee: Harland Simon Limited, Bletchley Buckinghamshire, England

[22] Filed: June 11, 1970

[21] Appl. No.: 45,424

[30] Foreign Application Priority Data

June 11, 1969 Great Britain.....................29,538/69

[52] U.S. Cl..................................114/221, 166/0.6, 166/77
[51] Int. Cl. ...............................B21b 33/035, B21b 33/126
[58] Field of Search .................166/577; 226/162; 254/29 R, 254/30, 31, 105, 106, 107; 114/221; 343/709, 719, 900, 901

[56] References Cited

UNITED STATES PATENTS

| | | |
|---|---|---|
| 2,555,145 | 5/1951 | McKinney..........................166/77 UX |
| 2,748,870 | 6/1956 | Basham et al...........................166/77 |
| 3,499,629 | 3/1970 | Horton ....................................254/93 |
| 3,500,907 | 3/1970 | Gentry................................166/0.6 X |

Primary Examiner—Milton Buchler
Assistant Examiner—Gregory W. O'Connor
Attorney—Baldwin, Wight & Brown

[57] ABSTRACT

Apparatus for forcing an insulated cable through an aperture in a bulkhead separating two fluids at different pressures comprising a pair of independently reciprocatable elements, means to cause said elements selectively to grip the cable and at the same time to form a seal around the cable, the arrangement being such that while one element grips and moves the cable in the required direction through the bulkhead, the other element is returning with its grip released to take up a position ready to grip the cable again and to continue its movement before the said one element releases the cable to return to begin another cycle, and means surrounding and in sealing engagement with the elements, said means being in sealing engagement around said aperture to separate the fluid from the other fluid.

12 Claims, 2 Drawing Figures

Patented May 30, 1972

Inventor:
Nicolas Worthing
BY Baldwin Wight Weller & Brown
Attorneys

APPARATUS FOR FEEDING A CABLE THROUGH AN APERTURE IN A BULKHEAD SEPARATING TWO LIQUIDS AT DIFFERENT PRESSURES

This invention relates to apparatus for feeding a cable through an aperture in a bulkhead separating two fluids at different pressures. The apparatus is particularly designed for streaming out a buoyant aerial cable from inside a submerged submarine and for winding the cable in again.

At present, when it is required to stream out a buoyant aerial cable from inside a submerged submarine, driven nip rollers or endless chains are used to grip the cable and force it through a stationary seal in the pressure hull of the submarine. It has been found that with this type of apparatus, both the seal and the cable wear rapidly. Factors contributing to the above disadvantages are that the outer diameter of the cable cannot be maintained to a close enough tolerance and that the nip mechanism tends to distort the insulating material of the cable.

The present invention seeks to provide apparatus suitable generally for feeding a cable through an aperture in a bulkhead separating two fluids at different pressures and particularly for streaming out (and winding in) buoyant aerial cable from inside a submerged submarine, which apparatus overcomes the above disadvantages and does not require that the cable be forced through a gland or seal.

According to the present invention, apparatus is provided for forcing an insulated cable through an aperture in a bulkhead separating two fluids at different pressures comprising a pair of independently reciprocatable elements which selectively grip the cable and at the same time form a seal around the cable, the arrangement being such that whilst one element grips and moves the cable in the required direction through the bulkhead, the other element is returning with its grip released to take up a position ready to grip the cable again and to continue its movement before the said one element releases the cable to return to begin another cycle, and means surrounding and in sealing engagement with the elements, said means being in sealing engagement around said aperture to separate the one fluid from the other fluid.

Preferably, each element comprises an inner tube, each tube being reciprocatable at a separate location inside a casing which surrounds the inner tube by power means, each inner tube being in sealed relationship with the casing. Preferably, the casing is connected to and in sealing engagement with the aperture in the bulkhead and the cable passes through a gland in an aperture in the casing leading into the submarine, the aperture in the bulkhead and through each reciprocatable inner tube. Preferably each inner tube has independent means which are hydraulically operated (but could be electrically operated) for gripping and releasing the cable. These means may comprise resiliently deformable or inflatable material inside the tube such that in a released state there is clearance between the material and the cable and in a gripped state the said material grips the cable and forms a seal between the cable and the respective inner tube. The means preferably comprise gripping sleeves.

It will be appreciated that one of the two inner tubes is always sealing one fluid from the other and there is no rubbing of the cable in a gland. However, without some compensating means the apparatus would pump one fluid into the other fluid regardless of the direction in which it was operating. Furthermore, the operating speed of the apparatus would be limited to that at which one of the fluids pumped by the piston action of one inner tube could flow through the clearance in the other inner tube. Preferably therefore, to overcome these disadvantages, compensating means are provided to pump an equal amount of fluid in the opposite direction to that being pumped at any given time by the two respective inner tubes.

The compensating means preferably comprise double ended piston assemblies. In the preferred embodiment, a double ended piston assembly is provided in a chamber to either side of each inner tube, and each of the double ended piston assemblies is arranged to be driven in an opposite direction to its respective inner tube and it is arranged that the fluid pumped by each inner tube is in communication with the chamber of the respective double ended piston assemblies so that the volume of fluid pumped by the piston action of the inner tubes is exactly compensated by the two piston assemblies, which together have a displacement equal to that of an inner tube. By providing two compensating piston assemblies, each having half the displacement area of each inner tube, each piston assembly being arranged on either side of the inner tubes, the whole apparatus is perfectly balanced dynamically.

In one embodiment, connecting means between the respective inner tubes and associated compensating pistons may include two endless drive systems entrained around pairs of pulleys, on opposite sides of each inner tube, the arrangement being such that one run of each endless drive system is secured to an inner tube and the other run of each endless drive system is secured to the compensating pistons.

Preferably the apparatus includes a rotary valve for controlling the application of fluid pressure to move the elements and to cause them selectively to grip the cable, said valve being advanced by a ratchet mechanism upon movement of the elements.

Apparatus according to the present invention, for pushing or pulling a long buoyant aerial cable through a pressure bulkhead between the inside of a submerged submarine and the sea, is now described with reference to the accompanying drawings, in which.

Figure 1:
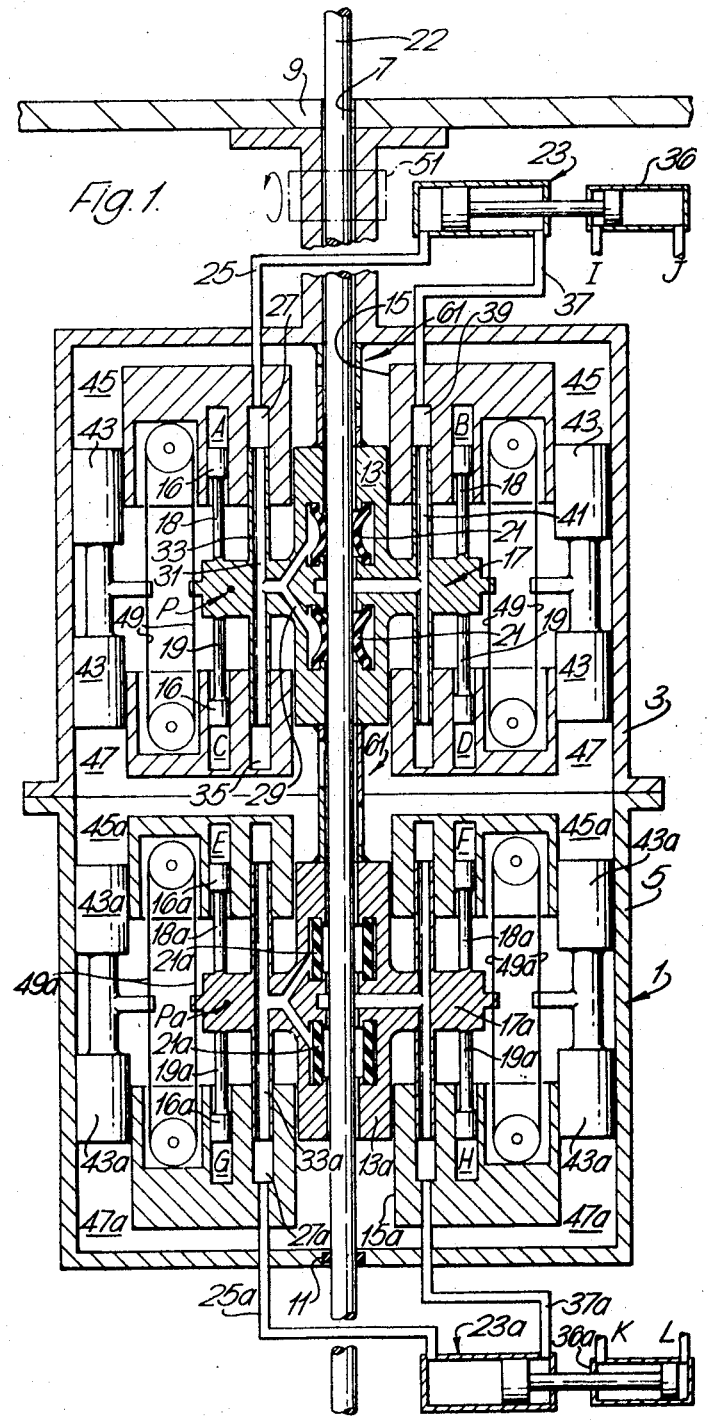
FIG. 1 is a schematic longitudinal sectional view.
Figure 2:
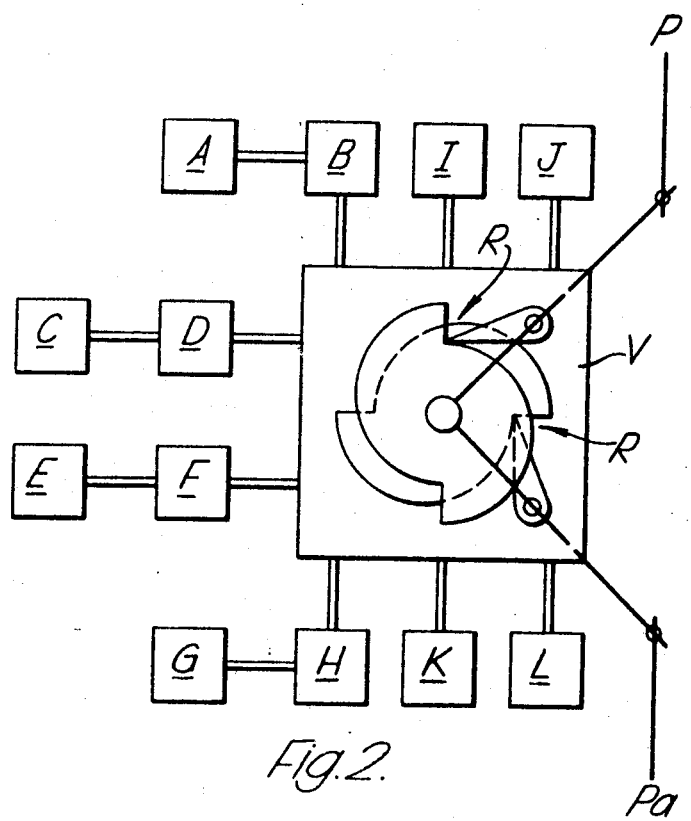
FIG. 2 is a schematic view of the sequence control apparatus.

The apparatus includes an outer casing 1, divided into at least two parts 3, 5, one end of the casing being in sealing engagement with an aperture 7 in a pressure bulkhead 9 of the submarine and the other end of the casing having an aperture therein leading to the interior of the submarine. A low pressure gland 11 of cellular material is provided at this aperture. A first inner driving tube or piston block element 13 (hereinafter called an inner tube) is slidably mounted within a first central bore 15 in the casing part 3, and a second inner tube element 13a is slidably mounted in a second central bore 15a co-axial with the bore 15, in the other casing part 5. Each inner tube 13, 13a is in sealing engagement with its respective bore 15, 15a. The tubes 13, 13a are provided with radial outwardly extending central flanges 17, 17a, from which a plurality of pairs of hydraulic rams 18, 19 and 18a and 19a extend for driving the inner tubes 13 and 13a respectively. The hydraulic rams are slidably mounted in bores A, B, C, D, E, F, G, H in the respective parts of the casing and the hydraulic connections to them and the associated valve control gear are shown in FIG. 2. The rams serve as operating means for reciprocating the tubes 13 and 13a independently, thereby to reciprocate gripping means respectively carried by the tubes 13 and 13a as set forth hereinafter. A pressure oil supply is preferably used for driving these rams, and both inner tubes 13, 13 a will be controlled by a single rotary valve V. The valve V is operated, through ratchets R, by push rods P, Pa connected to the inner tubes, and will be advanced by the inner tube moving in the forward direction at the time.

The inner tubes include a gripping device means each comprising a pair of gripping sleeve elements 21, 21a, respectively, each of which pairs is independently hydraulically controlled to move between a released position and a gripping position in which it will grip a cable 22 passing through it. The gripping sleeves are made of resiliently deformable material and are located in cavities in the respective tubes and their ends are sealed and fixed to the respective inner tubes. To cause, for example, the pair of gripping sleeves 21 to grip the cable 22, sea water is forced by grip effecting means comprising a piston pump 23 operated by application of pressure to a chamber J of a ram 36, through a conduit 25 into a bore 27 in the casing portion 3. The inner tube 13 is formed with a Y-shaped passage 29 communicating with the cavities surrounding the gripping tubes, and this passage 29 terminates in a further passage 31, each end of which is within a tube 33, one end of which tubes slides within the bore 27 and the other end of which slides in a similar sized bore 35 to provide telescopic connections, Hence, application of pressure to the bore 27 is effective to move the sleeves 21 into engagement with the cable 22. To release the grip, the double acting piston pump 23 is reversed, by application of fluid pressure to a chamber I of the hydraulic ram 36 so as to force sea water via a conduit 37 into a bore 39, which communicates, via a system of passageways 41 and bore (similar to the parts 29, 31, 33) into the space between the two gripping sleeves 21, to restore the clearance between them and the cable 22.

In the drawing the gripping sleeves 21 of the top inner tube 13 are gripping and driving the cable 22 forward, whilst the gripping sleeves 21a of the bottom inner tube 13a are released and the inner tube is returning to an initial position. Sea water is used as the hydraulic fluid in the piston pumps, and each pump is driven by the hydraulic ram 36 (or 36a) also controlled by the control valve V of FIG. 2.

As will be appreciated, the inner tubes are duplicated, together with their associate parts, and the duplicate parts are identified by the same reference numerals as the first parts, followed by the suffix a.

It will be appreciated that the sleeves of one or other of the inner tubes 13, 13a are always in gripping engagement with the cable 22 during operation, and one of the tubes is always moving longitudinally to move the cable. This means that the moving tube will act as a piston, thereby tending to pump water and/or air into or out of the casing and into or out of the submarine. However, because the tubes in gripping engagement with the cable provide the only pressure seal between the sea outside the submarine and the air within the submarine, the forces necessary to move the tubes against sea pressure would be very great, and would work against moving the cable at a steady continuous speed. Furthermore, one would expect, when the gripping sleeves on one of the inner tubes are released after the other gripping sleeves in the other tube have been engaged, fluid, i.e. water or air would be drawn through the released gripping sleeves thereby determining the speed at which the second tube may move longitudinally. This is of course, undesirable and compensating pistons 43, 43a are provided one on either side of each inner tube to overcome these disadvantages.

The compensating pistons 43, 43a are double acting and the respective chambers 45, 47, 45a, 47a in the casing and in which they are located are in communication with the respective end faces of the respective inner tubes 13, 13a and each chamber has a cross sectional area equal to half the cross sectional area of the "pistons" provided by the respective inner tube. The compensating pistons 43, 43a are caused to move at the same speed as, but in opposite directions to, their respective inner tubes so as to move the fluid being pumped by the gripping inner tube in the opposite direction and thus circulate the fluid rather than to pump it through the outer casing as will be described further hereinafter.

Drive means, in the form of a pair of endless driving elements 49 for the pistons 43, and 49a for the pistons 43a and entrained respectively around pairs of pulleys are provided to drive each pair of compensating pistons, the flange 17, 17a on the respective inner tube being connected to one run of each endless driving element and the respective compensating pistons being connected to the other run of the respective driving elements.

To operate the apparatus, the gripping sleeves 21, 21a are released and the end of the cable 22 is threaded through the gland 11, through the gripping sleeves 21a in the lower inner tube 13a and then through the other sleeves, and finally between a pair of sensing rollers (not shown). Once the cable passes through the rollers, the hydraulic circuit for the gripping devices is energized thereby causing one of the devices to grip the cable. A hull valve 51 is then opened and the driving devices then feed the cable up and out of the submarine into the sea.

The operating cycle is automatic and beings with one, say the lower inner tube 13a stationary at the bottom of its stroke with its gripping sleeves released, whilst the upper tube 13 will be moving up at a steady speed with its gripping sleeves 21 in a gripping position. As the upper i.e. first inner tube 13 approaches the top end of its stroke, the push rod P moves the control valve V to a position in which it initiates events in the following sequence:

1. Starts the lower inner tube 13a rising by causing fluid pressure to be applied to the bores G and H, and accelerates the lower inner tube 13a to the same speed as the upper inner tube 13.

2. Applies the gripping sleeves 21a of the lower inner tube 13a by application of pressure to the bores 27a, by means of the piston pump 36a being moved by application of fluid pressure to the chamber L of the ram 36a so that both the tubes 13 and 13a grip and move the cable together for a short distance.

3. Releases the gripping sleeves 21 in the upper tube 13 by pressure being applied to the bore 39, through application of pressure to chamber I of ram 36 to pressurize conduit 37 and bore 39.

4. Decelerates the upper inner tube 13 and reverses it so that it moves downwards away from the bulkhead 9 at a faster speed than that with which the lower inner tube 13a is rising by application of pressure to bores A and B, so that it reaches the bottom end of its stroke and rests there for a short period until the lower inner tube 13a approaches the top end of its stroke.

A half cycle has now been completed and when the lower inner tube 13a reaches the top end of its stroke, its push rod Pa advances the control valve V to initiate a similar half cycle with the roles of the two inner tubes being reversed.

These cycles repeat themselves automatically and the cable is pushed out at a steady continuous speed. It will be noticed that there is always one of the gripping sleeves in engagement with the cable, and hence the pressure of the sea will never reach the lower chamber 47a in the casing and pass through the gland 11. If any water does escape through the gland, it would be passed in known manner to the submarine's bilge.

To reverse the direction of motion of the cable, it is necessary merely to reverse the initiation of the events.

The provision of the compensating pistons 43, 43a ensures that air is not pumped from the submarine into the sea whilst pushing the cable out nor is sea water pumped into the submarine when pulling the cable in. Furthermore, the operating speed of the apparatus is not severely limited since the fluid surrounding each inner tube is not pumped by the other inner tube but is circulated by the compensating pistons around the respective inner tube.

It will be noted that suitable telescopic guide devices 61 are provided between the casing and the ends of the respective inner tubes, and between the ends of the inner tubes themselves, to prevent the cable being deformed while it is being pushed by the tubes.

The devices 61 are preferably in the form of a pair of coaxial tubular members of the same diameter, the free ends of each tubular member being slotted to define a plurality of projecting fingers, the fingers of one member engaging in the slots of the other member.

I claim:

1. Apparatus for forcing an insulated cable at a steady continuous speed through an aperture in a bulkhead separating two fluids at different pressures comprising a pair of independently reciprocatable elements, grip effecting means to cause said elements selectively to grip the cable and at the same time to form a seal around the cable, operating means for reciprocating said elements independently, control means for controlling the operation of said grip effecting means and said operating means for causing a cycle of operations in which one of said elements grips the cable and is operated by its associated operating means to move the cable in one direction through said aperture while the other of said elements, with its grip released, is being returned in the opposite direction by its associated operating means to take up a position to grip the cable and to then move in said one direction before the said one of said elements releases the cable to return in said opposite direction to begin another cycle, and sealing means surrounding and in sealing engagement with said reciprocatable elements, said sealing means being in sealing engagement around said aperture to separate the one fluid from the other fluid.

2. Apparatus as claimed in claim 1, in which said sealing means separating one fluid from the other fluid includes an outer casing, each of said elements comprises an inner tube, said tubes being inside of and surrounded by said casing at separate locations therein and being reciprocatable by said operating means, said operating means comprising power means, and each of said tubes being in sealed relationship with said casing.

3. Apparatus as claimed in claim 2, in which said bulkhead is the bulkhead of a submarine, said casing is connected to and in sealing engagement with the aperture in the bulkhead and in which the cable is passed through said aperture in said bulkhead and an aperture in said casing leading to the interior of the submarine, and through each reciprocatable inner tube.

4. Apparatus according to claim 3, including independent means for each inner tube, which means are hydraulically operated to grip and release the cable.

5. Apparatus according to claim 4, in which each of said independent means comprises a resiliently deformable material so positioned inside the associated tube that in a released state there is a clearance between the material and the cable and in a gripped state the material grips the cable and forms a seal between the cable and the respective inner tube.

6. Apparatus according to claim 5, in which each of said independent means comprises one or more resiliently deformable gripping sleeves arranged in recesses within the inner tube, each of said sleeves being moved between gripping and release positions by fluid pressure acting respectively on the outside or the inside of the sleeve.

7. Apparatus according to claim 6, including a double acting piston pump for each sleeve of each gripping means, a first fluid line leading from the pump, on one side of the piston, via a telescopic connection, to the exterior of the gripping sleeve(s) and a second fluid line leading from the pump on the other side of the piston, via a telescopic connection, to the inside of the gripping sleeve(s).

8. Apparatus according to claim 1, including a casing in which said independently reciprocatable elements are mounted, and fluid volume compensating means associated with each said element to prevent fluid being pumped out of the casing upon movement of an element, said compensating means being arranged to pump an equal amount of fluid in the opposite direction to that being pumped at any given time by one of said elements.

9. Apparatus according to claim 8, in which the compensating means comprises at least one double ended piston assembly for each element.

10. Apparatus according to claim 9, including a double ended piston assembly arranged one each side of its respective element, the two ends of said piston being located respectively in chambers connected to the respective ends of the element, and means connecting said two double ended pistons with the respective element to cause it to move in the opposite direction to the element.

11. Apparatus according to claim 10, in which the connecting means comprises two endless drive systems each entrained around a pair of pulleys arranged on opposite sides of each element, one run of each endless drive system being secured to the element and the other run of each endless drive system being secured to one of the double ended pistons.

12. Apparatus according to claim 1, in which said grip effecting means and said operating means are operable by fluid pressure, and including a rotary valve for controlling the application of fluid pressure to said operating means to move said elements and said grip effecting means to cause them selectively to grip the cable, and a ratchet mechanism for advancing said valve upon movement of the elements.

* * * * *